United States Patent [19]

Dilling

[11] Patent Number: 4,546,173

[45] Date of Patent: Oct. 8, 1985

[54] SELECTIVE CROSSLINKING OF LOW MOLECULAR WEIGHT SULFONATED LIGNINS AND LIGNOSULFATE PRODUCTS PRODUCED THEREBY

[75] Inventor: Peter Dilling, Isle of Palms, S.C.

[73] Assignee: Westvaco Corporation, New York, N.Y.

[21] Appl. No.: 666,473

[22] Filed: Oct. 30, 1984

Related U.S. Application Data

[63] Continuation-in-part of Ser. No. 532,677, Sep. 16, 1983, abandoned.

[51] Int. Cl.$^4$ ................................................ C07G 1/00
[52] U.S. Cl. .................................... 530/501; 530/502; 530/505
[58] Field of Search .................... 530/501, 502, 505

[56] References Cited

U.S. PATENT DOCUMENTS

| | | | |
|---|---|---|---|
| 2,525,433 | 10/1950 | Voet | 106/30 |
| 2,680,113 | 6/1954 | Adler et al. | 260/124 |
| 2,690,973 | 10/1954 | Voet | 106/20 |
| 3,094,515 | 6/1963 | Keirstead et al. | 260/124 |
| 3,156,520 | 11/1964 | Blaisdell | 8/91 |
| 3,503,762 | 3/1970 | Remer | 106/23 |
| 3,726,850 | 4/1973 | Detroit | 260/124 A |
| 3,769,272 | 10/1973 | Hintz | 260/124 R |
| 3,841,887 | 10/1974 | Falkehag et al. | 106/123 LC |
| 4,001,202 | 1/1977 | Dilling et al. | 260/124 R |
| 4,131,564 | 12/1978 | Dilling | 252/353 |
| 4,184,845 | 1/1980 | Lin | 8/34 |
| 4,244,728 | 1/1981 | DelliColli et al. | 71/65 |
| 4,308,203 | 12/1981 | Lin | 260/124 R |
| 4,332,589 | 6/1982 | Lin | 8/557 |
| 4,355,996 | 10/1982 | Dilling et al. | 8/561 |

OTHER PUBLICATIONS

Brauns et al., *The Chemistry of Lignin*—Supplement vol. (1960) pp. 553–555.

*Primary Examiner*—Delbert R. Phillips
*Attorney, Agent, or Firm*—Terry B. McDaniel; Richard L. Schmalz

[57] ABSTRACT

A process for preparing sulfonated lignins suitable for use as dispersants and additives in dye compositions wherein sulfonated lignins are post-sulfonation crosslinked with a crosslinking agent of the aldehyde, epoxide, or polyhalide type at a pH range of between about 6.1 to 9 to selectively crosslink the low molecular weight fraction of the sulfonated lignins to provide improved heat stability and dispersibility of the sulfonated lignins in dye compositions. The invention also concerns disperse and vat dye compositions, and printing gels, containing the sulfonated lignins as a dispersing agent or additive.

14 Claims, 1 Drawing Figure

SELECTIVE CROSSLINKING OF LOW MOLECULAR WEIGHT SULFONATED LIGNINS AND LIGNOSULFATE PRODUCTS PRODUCED THEREBY

This application is a continuation-in-part of pending application Ser. No. 532,677, filed on Sept. 16, 1983, now abandoned.

BACKGROUND OF THE INVENTION

1. Field of the Invention

This invention relates to a new and improved process for preparing sulfonated lignins and the resulting products which are suitble for use as dispersants and additives in dyestuffs. More particuarly, the invention concerns a process for preparing such sulfonated lignin dye dispersant products having improved heat stability and dispersion capabilities in disperse dyes and printing gels or pastes. The invention also concerns dye compositions containing sulfonated lignin additives.

2. The Prior Art

Dyestuff compositions generally are comprised of a dye cake, i.e., of disperse dyes or vat dyes, and a dispersant. These dyestuff compositions are widely used to color both natural and synthetic fibers. In the dyestuff composition, the dispersant serves three basic functions:

(1) It assists in reducing the dye particle to a fine size;
(2) It maintains a dispersing medium; and
(3) It is used as a diluent.

Dye dispersants are generally one of two major types, sulfonated lignins from the wood pulping industry via the sulfite or kraft processes or napthalene sulfonates from the petroleum industry.

The advantages of employing sulfonated lignins as dispersants in dyestuff compositions are based on their unique physical properties which include good capability to many dye systems, outstanding dispersant characteristics at ambient and elevated temperature, and availability. There are, however, certain disadvantages in employing lignins, whether they are sulfite lignins or sulfonated kraft lignins, as dispersants. Negative factors in the use of such lignins as dyestuff additives relate to problems of foaming, high pH, fiber staining, poor heat stability, and high viscosity. The adverse properties are troublesome to dyers and many attempts have been made to overcome these and other disadvantages.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. U.S. Pat. No. 4,001,202 to P. Dilling and G. Prazak describes a process for preparing a sulfonated lignin with improved fiber staining properties useful as a dye dispersant by reacting such lignin with an epihalohydrin. Additional patents directed to reacting or modifying lignins to make them more suitable as dye dispersants include U.S. Pat. No. 4,184,845 to S. Y. Lin; U.S. Pat. No. 4,131,564 to P. Dilling; U.S. Pat. No. 3,158,520 to L. A. Baisdell; U.S. Pat. No. 3,094,515 to K. F. Keirstead et al; U.S. Pat. No. 3,726,850 to Detroit; U.S. Pat. No. 2,680,113 to E. Adler et al; U.S. Pat. No. 3,769,272 to Hintz; U.S. Pat. No. 3,841,887 to Falkehag et al; U.S. Pat. No. 4,131,564 to Dilling; U.S. Pat. No. 4,355,996 to Dilling et al; and U.S. Pat. No. 4,308,203 to Lin. U.S. Pat. No. 2,525,433; U.S. Pat. No. 2,690,973; and U.S. Pat. No. 3,503,762 disclose the use of lignins as an additive in printing inks, pastes, and gels. The art cited is meant to show the state of the art and not intended to be all inclusive of lignin modifications.

BRIEF OBJECTS OF THE INVENTION

It is a general object of this invention to provide a process whereby sulfonated lignins may be prepared to improve their usefulness as dye dispersants in dyestuff compositions.

Another object is to provide a process for producing sulfonated lignins to improve their usefulness as additives in printing pastes, disperse and vat dyes.

A further object is to provide a process for improving the heat stability of sulfonated lignins by selective post-sulfonation cross-linking of low molecular weight lignins without appreciably increasing viscosity of the lignins or dyestuff compositions in which they are used.

A more specific object is to improve the dispersion and heat stability of sulfonated lignins containing large portions of low molecular weight sizes by post-sulfonation crosslinking of the sulfonated lignins at controlled lower pH levels.

It is another object to provide an improved sulfonated lignin dye additive.

It is a further object to provide improved dye compositions containing sulfonated lignins therein.

Other objects, features and advantages of the invention will be seen in the following detailed description of the invention.

SUMMARY OF THE INVENTION

Heat stability and dispersibility of sulfonated lignins useful as dye dispersants in dyestuff compositions and printing pastes are improved by post-sulfonation cross-linking of low molecular weight sizes of the sulfonated lignins at controlled lower pH levels so that only a portion of the lignin is affected by the crosslinking agent, namely the low molecular weights.

More particularly, sulfonated lignins are treated by the use of a known crosslinking agent for the sulfonated lignins, typically aldehydes, epoxides, and polyhalides. Particularly suitable are compounds selected from the group consisting of formaldehyde, glyoxal, glutaric dialdehyde, epichlorohydrin, chloroacetaldehyde, cyanuric chloride, and their derivatives. The crosslinking agent selectively crosslinks low molecular weight phenol entities of the lignin and the pH of the reaction is maintained between about 6.1 to 9. The crosslinking reaction may be carried out on an aqueous composition of the sulfonated lignin at moderate temperatures for an extended period of time, or at an elevated temperature of around 140° C. for a shorter period in an autoclave.

In a preferred embodiment, the sulfonated lignins are cross-linked by employing about 0.6 mole formaldehyde based on 1 mole lignin solids, at a pH of between about 7 to 8.5.

The resultant cross-linked lignins exhibit improved heat stability in dyestuff compositions without appreciable undesirable increase in viscosity and loss of dispersibility of the products.

DETAILED DESCRIPTION OF THE INVENTION

Figure 1:
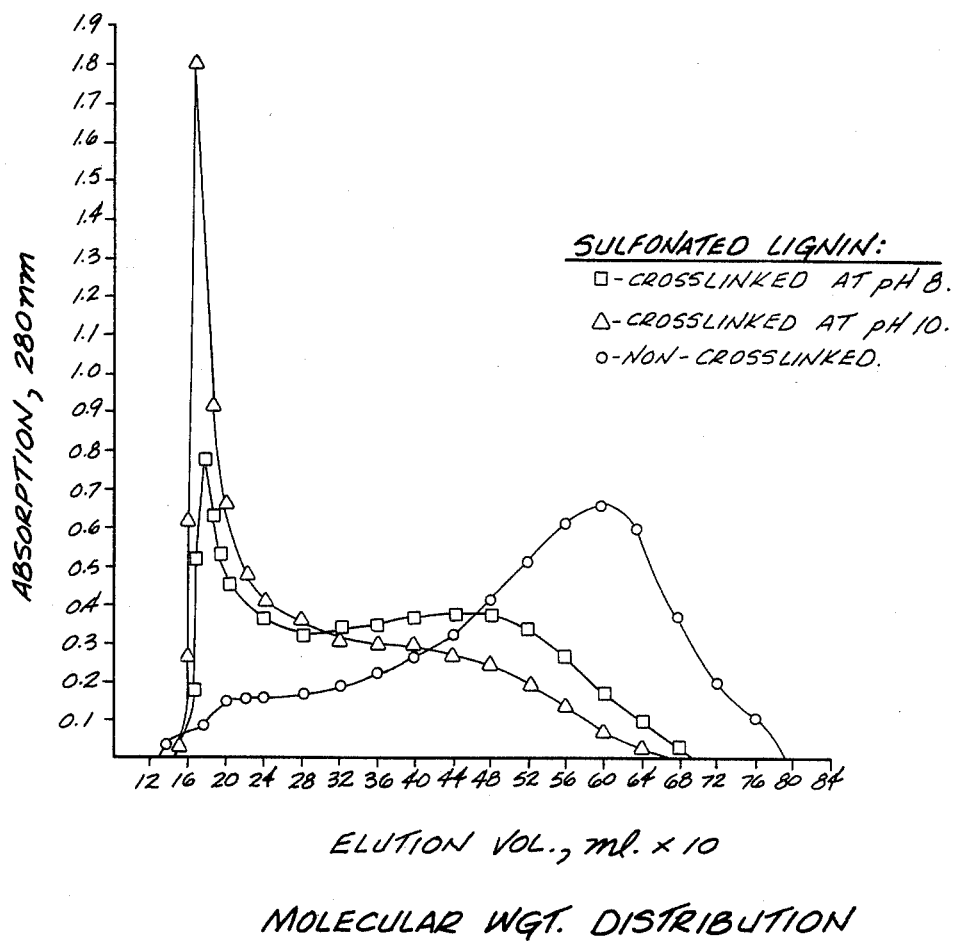
FIG. 1 is a graph illustrating the molecular size effect of formaldehyde crosslinking reactions on sulfonated lignins at varying pH levels.

Lignin is obtained from spent pulping liquors, known as black liquor, of the pulp industry where lignocellulosic materials, such as wood, straw, cornstalks, bagasse and the like are processed to separate the cellulosic pulp from the lignin. The lignins employed in the process of this invention may be obtained from the kraft wood pulping process wherein the natural lignin is present as a sodium salt. In kraft pulping, the wood is subjected to the effects of strong alkali. The lignin in this process forms a soluble sodium salt which is separated from the celulose and dissolves in the pulping liquor. The lignin is recovered from the spent pulping liquor, known as black liquor, by acidification.

Acidification of the black liquor containing the lignin salt generally may be accomplished by the introduction of carbon dioxide. Upon the addition of carbon dioxide to the black liquor, the phenolic hydroxide groups on the lignin molecule, which are in ionized form, are converted into their free phenolic or acidic form. This conversion renders the lignin insoluble in the black liquor, as a result of which it precipitates out.

Lignins present in black liquor exist at various molecular weights. The molecular weight profile of lignin is very broad starting with very low molecular weight constituents of about 300 and reaching maximum numbers at approximately 300,000. By selectively extracting specific molecular weight fractions by ultrafiltration and testing their effects on quality in water-insoluble dyestuff dispersions, lignins with a low molecular weight (10,000 and below) have been found to negatively affect the heat stability and dispersion qualities in their use with dyestuffs, particularly as compared to their higher molecular weight counterparts (greater than 10,000), sometimes causing dye specking on the dyed finished fiber. One effective way to eliminate this undesirable portion is to physically separate this particular low molecular weight fraction by known membrane technologies. This process, however, is expensive and capital intensive. Another way is to exclude a large portion of this fraction during the process of filtering lignin from the pulping liquor. This technique, although least expensive, has a significant drawback in that undesirable constraints during the lignin filtration and purification step have commonly been observed at the higher lignin filtration pH required; and thus the technique is not commercially viable. In the investigation of other alternatives, we have found that the quality of the lignosulfonate can significantly be improved by a post-formaldehyde treatment in a pH range where only the low molecular weight lignin structures are converted to higher weights.

The alkali lignins are usually recovered from black liquor as water insoluble products by a precipitation procedure, wherein the black liquor initially having a pH of around 13 is acidified to about a pH of 9.5 at which point the lignin precipitates from the black liquor. To purify the lignin precipitate the level may be reduced to pH 2. The precipitate is heat coagulated and washed with water. Lignin obtained from the kraft, soda or other alkaline processes is not recovered as a sulfonated product, but is easily sulfonated by reacting such material with a bisulfite or sulfite. A sulfonated lignin is any lignin containing at least an effective amount of sulfonate groups to give water solubility in moderately acid and higher pH solutions.

The next step in developing a kraft (or alkaline) lignin based dye dispersant is to properly sulfonate the lignin to provide water solubility. It should be noted that the degree of sulfonation of a lignin is proportional to the solubility of that lignin in an aqueous solution and the viscosity of such lignin. One of the conventional processes for sulfonating a lignin involves sulfomethylation of alkali lignin by reacting the lignin with sodium sulfite and formaldehyde. This process is described by Adler et al U.S. Pat. No. 2,680,113. Sulfomethylation acts upon the aromatic phenolic nuclei of the lignin molecule in such a manner that $-CH_2SO_3H$ groups are bonded to the aromatic phenolic ring. Adler teaches that the treatment of the lignin with these sulfonation agents is carried out within a temperature range of 50° of 200° C., suitably 80° to 170° C., preferably 100° C. to 160° C. It has also been a practice to sulfonate the lignin side-chain of the aromatic nucleus by sodium sulfite treatment of the lignin in the absence of formaldehyde.

In the past, the sulfomethylation of the alkali lignin was carried out at a high pH, generally at pH levels of 9 or more, in order to ensure optimum phenol ionization to occur. Subsequent modification by crosslinking was conducted at similar high pH levels. However, this caused higher molecular weight alkali lignin entities with the consequent undesirable higher viscosity of the sulfonated lignin dyestuff dispersant. This is due to the fact that all lignin molecular weight ranges are involved in the crosslinking step.

FIG. 1 shows the shifts of molecular weight distributions of sulfonated lignin structures crosslinked at higher and lower pH levels as compared with non-crosslinked sulfonated lignins. In producing the graph of FIG. 1, lignin samples crosslinked at pH levels of 8 and 10 and a non-crosslinked lignin product were subjected to testing for molecular weight distributions by means of gel permeation chromatography.

Three 600 mm.×25 mm. glass columns with associated fittings were packed with a solid Sephadex gel (G-100, medium) manufactured by Pharmacia Fine Chemicals A.B., Uppsala, Sweden. Solutions of each of the sulfonated lignin samples, respectively non-crosslinked, crosslinked at pH 8, and crosslinked at pH 10, were passed with a 0.1N NaOH solution through each of the columns. Selected 10 ml. eluent samples from each column were collected in a fraction collector. UV absorption measurements of these samples were made at 280 nanometers on a Beckman DK-2A Spectrophotometer. The curves shown in FIG. 1 were prepared by plotting the recorded relative intensities of eluent samples at the particular total volume of eluent indicated. Since higher molecular weight lignin fractions are less absorbed by the gel and thus pass more quickly through the column than lower molecular fractions, and since the absorption readings indicate a higher concentration of lignin in the eluent sample, the curves represent the molecular weight distributions of the three lignin samples.

The vertical axis of the graph of FIG. 1 represents absorption intensity measurements at 280 nanometers while the horizontal axis represents the elution volume at which samples were taken.

The graph shows that post-sulfonation crosslinking at high pH (pH 10) results in a much greater number of lignin molecules falling in the large molecular size range. However, by crosslinking at lower pH (pH 8), the crosslinking occurs more selectively in the low molecular size portion of the lignin, and a reduced portion of the lignin falls in the large molecular weight range (although still a significant increase over the non-crosslinked sulfonated lignin).

More recently, I have found that the viscosity of sulfonated lignins useful as dye dispersants in dyestuff compositions can be reduced with improvement in heart stability properties by removing the low molecular weight component of the lignin and reacting the resulting lignin material with sodium sulfite ($Na_2SO_3$) and an aldehyde at a lower pH (below pH 9). Such a process is described with particularity in my copending, commonly assigned U.S. Pat. Application Ser. No. 389,625, filed June 18, 1982, the disclosure of which is incorporated herein by reference.

As set forth in said pending application, the lignin slurry exists at an initial pH range of about 1.8 to 3.5. The pH of the lignin slurry is adjusted to about pH 5 through the use of sodium hydroxide. At this point, sodium sulfite is added and the pH of the reaction mixture is raised to a range of about 7 to 7.5. Sulfomethylation occurs upon the addition of formaldehyde and heating to a temperature ranging from about 130° to 175° C., preferably about 140° C. The temperature is maintained for a period of time ranging from about 30 minutes to $2\frac{1}{2}$ hours, preferably 2 hours. The final pH of the solution is from about 8 to 9.2.

The use of low pH and low temperature has advantages. For one thing, the lignin is less likely to decompose at these conditions than under the normal reaction conditions. The fact that the sulfonation occurs at a relatively low pH means that the resulting sulfonated lignin product will possess a pH lower than what would otherwise be obtainable. When sulfonated lignins are employed as dye dispersants, it is preferred that the pH of such lignins range from about 4 to about 8. If a lignin is sulfonated at a high pH, the resulting sulfonated lignin will have a high pH. In order for a dyer to use such sulfonated lignin as a dispersant, the dyer is required to add an acid to such lignin to lower the pH which translates into additional expense. By sulfonating the lignin at a low pH, a sulfonated lignin is obtained which does not require the use of acid to render it suitable as a dye dispersant.

The elimination of the need to employ an acid to lower the pH of sulfonated lignin, in order to effectuate its use as a dispersant, has an additional advantage besides cost. The use of an acid to lower the pH normally results in the production of an electrolyte. The presence of an electrolyte in the sulfonated lignin has a tendency to affect in a negative manner the heat stability of certain dye products which contain such lignin as a dispersant. The elimination of the need to add acid to the sulfonated lignin thus avoids the problems associated with the presence of electrolytes.

I have now discovered that heat stability and dispersibility of sulfonated lignins useful as dye dispersants may be further enhanced by a crosslinking of the low molecular weight sizes of the sulfonated lignins after their sulfonation by use of a suitable crosslinking agent while maintaining a pH range of the reaction between about 6.1 to 9. The post-crosslinking step of the process selectively crosslinks the low molecular weight phenol entities of the lignin which further improves the heat stability of the lignin without appreciably raising the viscosity of the sulfonated lignin dye dispersant to an undesirable level.

As a crosslinking agent, compounds typically known to provide effective crosslinking of sulfonated lignins may be employed. Such compounds are described in a number of prior art patents, certain of which have been identified above and further included in DelliColli et al U.S. Pat. No. 4,244,728. Typically, such crosslinking agents are the aldehydes, epoxides, and polyhalide compounds. Such compounds include formaldehyde or formaldehyde forming materials, and in particular, may be selected from the group consisting of formaldehyde, paraformaldehyde, glyoxal, glutaric dialdehyde, epichlorohydrin, chloroacetaldehyde, cyanuric chloride, and derivatives thereof. Formaldehyde is readily available and widely used in sulfomethylation of lignins to provide water solubility for the dyestuff dispersant.

The amount of crosslinking agent employed in the post-sulfonation crosslinking step of the present invention may be varied, e.g., from about 0.1 mole to 5 moles per mole of lignin solids, with acceptable results. The use of about 0.6 mole of formaldehyde per mole of lignin solids produces excellent results in achieving the degree of cross-linking desired.

The crosslinking reaction may be conveniently carried out in an aqueous medium comtanining the lignin at a temperature of about 100° C. for five hours. If acceleration of the reaction is desired, the reaction may be conducted at an elevated temperature of about 140° C. for one hour in an autoclave. These conditions may be varied further depending upon the speed of reaction desired.

The invention will be better understood, and the advantages thereof better appreciated by means of the following examples illustrating typical procedures for preparing the sulfonated lignin dye dispersants of the present invention, and comparing the results obtained with sulfonated lignins prepared without a post-sulfonation crosslinking step.

EXAMPLE I

Sulfonation of the Lignin

Two hundred grams solids lignin, based on a 25% solids A-lignin slurry (a washed aqueous lignin slurry at a pH of 2) is used for the starting material. To this slurry is added 1.3 moles of sodium sulphite (32.76 g) and 0.8 mole formaldehyde (4.8 g.) and the slurry is stirred for several minutes. The pH of the slurry is adjusted to 7.3 using sodium hydroxide (50% solution) and continuously stirred until smooth and pH stable.

The treated slurry is then placed in an autoclave, heated to 140° C., and held for two hours. The sulfomethylated lignin exhibited a final pH of 8.8.

Post Sulfonation Crosslinking of the Sulfomethylated Lignin

After cooling to 90° C., 0.6 mole formaldehyde (3.6 g) is added to the sulfomethylated lignin prepared as above. The composition is then heated to 100° C. and maintained at this temperature for 5 hours. The resultant post-sulfonation crosslinked lignin, exhibiting a pH of 8.8, was tested for (1) initial viscosity, (2) viscosity of dye compositions containing the lignin as a dispersant, after grinding, and (3) heat stability of the dye compositions containing the sulfonated lignin dispersant.

To obtain viscosity measurements, the sulfonated lignin compositions were heated to about 70° C. and glacial acidic acid was added slowly until a pH of 8 was obtained. The solids concentration was adjusted as indicated in Tables I and II and the temperature of the composition was maintained at 25° C. The sulfonated lignin/dye compositions were not heated before testing. A Brookfield viscometer (Model LVT) was employed for all measurements.

To obtain heat stability measurements, dye lignin compositions consisting of 50 grams of the particular dye, 35 grams of the sulfonated lignin, 125 milliliters of water and 5 drops of ethylenediaminetetraacetic acid (1% solids at pH 10–10.5) were prepared and the pH adjusted to 8 with acetic acid. The dye compositions were ground in a ball mill to the point where the filter test for disperse dyes was passed. To 1 gram of each solid dye composition was added 250 millileters of water, the solution boiled for 15 minutes, and then filtered through a tared Whatman filter paper no. 2 above a no. 4 (with vacuum) as specified in the standard American Association of Textile Chemists and Colorists (AATCC) heat stability test. The time for the filtration was recorded, the filter paper dried, and the residual dye material remaining on the filter was calculated by weight and visually observed.

The data obtained for the post-sulfonation crosslinked lignin dye dispersant described above was then compared directly to similarly obtained viscosity and heat stability data on sulfomethylated lignins prepared by sulfonation at pH levels of 8.8 and 10, respectively, but without post-sulfonation crosslinking, as the lignins of the present invention. The results of the data collected are presented in the following table.

based on lignin solids and the mixture stirred for several minutes. The pH of the slurry was 7.1. The pH of the slurry was adjusted to 7.3 using sodium hydroxide (50% solution) and the composition stirred until smooth and pH stable. The sample was then placed in the autoclave, heated to 140° C., and held for two hours. The final sulfonated lignin (side chain sulfonation) had a pH of 8.8.

Post-Sulfonation Crosslinking of the Sulfonated Lignin

After cooling, the above sulfonated lignin was crosslinked by the addition of 0.6 mole formaldehyde (3.6 g) based on solids lignin. The composition was heated to 140° C. for one hour in an autoclave and exhibited a final pH of 8.8. The product was tested for initial viscosity, viscosity of dye compositions containing the lignin as a dispersant after grinding, and heat stability of the dye compositions containing the lignin dispersant, in accordance with test procedures described in Example I.

The results of data collected were compared to corresponding viscosity and heat stability measurements of side chain sulfonated lignin samples which were respectively sulfonated at (1) a pH of 8.8 without crosslinking, (2) at pH 8.8 with $CH_2O$ post-crosslinking at pH 10.5, (3) at pH 10.5 without post-crosslinking, and (4) at pH 10.5 with post-crosslinking at pH 10.5. The comparative data is presented in the following table.

TABLE I

| TYPE OF TESTING | LIGNIN SULFOMETHYLATED AT pH 8.8 | SULFOMETHYLATED LIGNIN, POST-CROSSLINKED WITH $CH_2O$ AT pH 8.8 | SULFOMETHYLATED LIGNIN POST-CROSSLINKED WITH $CH_2O$ AT pH 10 |
| --- | --- | --- | --- |
| Viscosity of Lignin Product at 30% solids 25° C. pH 8 | 100 cps | 2500 cps | 48,250 cps |
| Viscosity of Dye-Lignin Composition After Grinding at 35% solids | | | |
| CI Red 1 | 70 cps | 85 cps | 940 cps |
| Heat Stability | | | |
| CI Red I | 0.0181 g (grainy & specky) | 0.0085 g (clean) | 0.0110 g (clean) |

EXAMPLE II

Sulfonation of the Lignin

To a 25% solids A-lignin slurry containing 200 grams solids lignin is added 1.3 moles sodium sulfite (32.76 g)

TABLE II

| TYPE OF TESTING | SULFONATED LIGNIN SULFONATED AT pH 8.8 | LIGNIN SULFONATED AT pH 8.8 AND POST-CROSSLINKED WITH 0.6 MOLE $CH_2O$ AT | | SULFONATED LIGNIN SULFONATED AT pH 10.5 | LIGNIN SULFONATED AT pH 10.5 AND POST-CROSSLINKED WITH $CH_2O$ at pH 10.5 |
| --- | --- | --- | --- | --- | --- |
| | | pH 8.8 | pH 10.5 | | |
| Viscosity of Lignin product at 25% solids 25° C. pH 8 | 98 cps | 800 cps | 17,000 cps | 110 cps | 22,000 cps |
| Viscosity of Dye-Lignin Composition After Grinding at 32% solids | | | | | |
| CI Red 1 | 15 cps | 17 cps | 120 cps | 27 cps | 63 cps |
| CI Blue 118 | 29 cps | 94 cps | >400,000 cps | 47 cps | >400,000 cps |
| CI Yellow 88 | 10 cps | 14 cps | 63 cps | 8 cps | 37 cps |
| Heat stability | | | | | |
| CI Red 1 | 0.0261 g (slightly grainy) | 0.0114 g (clean) | | 0.149 g (slightly grainy) | 0.133 g (clean) |
| CI Blue 118 | 0.090 g (slightly grainy) | 0.023 g (clean) | | 0.102 g (slightly grainy) | 0.054 g (clean) |
| CI Yellow 88 | 0.019 g (slightly grainy) | 0.003 g (clean) | | 0.092 g (slightly grainy) | 0.001 g (clean) |

As can be seen from the data recorded in Tables I and II, sulfonated lignin products which were post-sulfonation crosslinked in accordance with the present invention at pH levels lower than about 9 exhibited improved heat stability over those sulfonated lignins which were not post-crosslinked, or were post-crosslinked at pH levels higher than about 9. Improved heat stability is evidenced by the smaller amount and clean appearance of the filter paper residue. Such improvements were obtained without increasing the viscosity of the sulfonated lignin or the viscosity of the dye/lignin composition to an unacceptable level.

EXAMPLE III

A first sample of a lignin sulfonated as in Example II was post-sulfonation crosslinked with 0.6 mole of formaldehyde at pH 8.8 and exhibited a viscosity of 800 cps. Improved heat stability was evidenced by nominal amounts of clear residue on the filter paper test. A second sample of the same sulfonated lignin was post-sulfonation crosslinked with 0.6 mole formaldehyde at a pH of 7.5 and exhibited a viscosity of 490 cps. Improved heat stability was evidenced by a nominal amount of clear residue on the filter paper test. The foregoing results indicate that post-sulfonation crosslinking at a lower pH level results in a corresponding lower viscosity of the sulfonated lignin dispersant and consequent improved dispersibility of the dye lignin in the dye composition.

EXAMPLE IV

A number of lignin samples were side chain sulfonated as in Example II at a pH of 8.8 using 1.1 mole sodium sulfite per mole solids lignin. The samples were subsequently post-sulfonation crosslinked with 0.75 mole formaldehyde at varying pH levels. The resultant crosslinked product samples were employed as additives in printing gels. The viscosities of the several printing gel compositions containing the sulfonated lignins were calculated and the results of these viscosity measurements were compared with results of a low pH sulfonated lignin without post-sulfonation crosslinking. These results are set forth in Table III.

TABLE III

| Product Sample | Crosslinking pH | Printing Gel Viscosity (cps) |
|---|---|---|
| 1 | No crosslinking agent | 1,680 |
| 2 | 10 | 2,100 |
| 3 | 7.5 | 3,700 |
| 4 | 7.0 | 3,700 |

From the data indicated in Table III, it can be seen that sulfonated lignins which are post-sulfonation crosslinked at lower pH levels, e.g., 7.5 and 7, when added to printing pastes or gels, produce desirably higher printing gel viscosities, due to the somewhat greater degree of crosslinking and thus higher molecular weight of the lignins. Higher printing gel viscosities are desirable in order to more effectively maintain the color localized in a printing operation, without spreading or running of the color on the printed substrate. In addition, a lower final pH of the sulfonated lignin dye additive, e.g., 7.5, 7.0, eliminates the need for addition of acid to adjust the pH to the desired level for printing, thus minimizing undesirable production of electrolytes in the printing composition, as referred to hereinbefore.

While the foregoing examples have illustrated various embodiments of the invention, it should be understood that other variations and modifications which fall within the scope of the appended claims are to be included therein.

That which is claimed is:

1. In an improved process for preparing sulfonated lignins particularly suited for use as dye dispersants and additives comprising the steps of preparing a sulfonated lignin and crosslinking the sulfonated lignin, the improvement comprising maintaining the pH of the crosslinking reaction between about 6.1 to 9 to selectively crosslink the sulfonated lignin fraction having molecular weights of 10,000 and below.

2. The process as defined in claim 1 wherein the lignin is crosslinked by the addition of a crosslinking agent selected from the group consisting of aldehydes, epoxides, polyhalide compounds, and their derivatives.

3. The process as defined in claim 2 wherein the crosslinking agent is selected from the group consisting of formaldehyde, glyoxal, glutaric dialdehyde, epichlorohydrin, chloroacetaldehyde, cyanuric chloride, and their derivatives.

4. The process as defined in claim 1 wherein the pH of the crosslinking reaction is maintained between about 7 to 8.5.

5. The process as defined in claim 1 wherein the sulfonated lignin is crosslinked with formaldehyde and wherein formaldehyde is added to the sulfonated lignin in an amount from about 0.1 mole to 5 mole of solids lignin.

6. The process as defined in claim 5 wherein formaldehyde is present in an amount of about 0.6 mole per mole solids lignin.

7. The process as defined in claim 1 wherein the crosslinking reaction is carried out under elevated temperatures for at least approximately 1 hour.

8. The process as defined in claim 7 wherein the reaction is carried out at a temperature of about 100° C. for 5 hours.

9. The process as defined in claim 7 wherein the reaction is carried out at a temperature of approximately 140° C. for 1 hour under autoclave conditions.

10. The process as defined in claim 1 wherein the sulfonated lignin is prepared by sulfomethylation of the lignin at a pH level of below about 9.

11. An improved dye dispersant comprising a sulfonated lignin which is post-sulfonation crosslinked with a crosslinking agent wherein the improvement comprises crosslinking at a pH of between 6.1 to 9 to selectively crosslink the sulfonated lignin fraction having molecular weights of 10,000 and below.

12. The dispersant as defined in claim 11 wherein the pH is between about 7 to 8.5.

13. The dispersant as defined in claim 11 wherein the dispersant contains from about 0.1 to 5 moles formaldehyde per mole solids sulfonated lignin.

14. The dispersant as defined in claim 13 wherein the dispersant contains 0.6 mole formaldehyde.

* * * * *